United States Patent
Jo et al.

(10) Patent No.: US 10,645,605 B2
(45) Date of Patent: May 5, 2020

(54) METHOD AND DEVICE FOR REPORTING CHANNEL QUALITY FOR SPATIAL SHARING

(71) Applicant: LG ELECTRONICS INC., Seoul (KR)

(72) Inventors: Kyungtae Jo, Seoul (KR); Hangyu Cho, Seoul (KR); Jinmin Kim, Seoul (KR); Sungjin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/070,213

(22) PCT Filed: Jan. 11, 2017

(86) PCT No.: PCT/KR2017/000376
§ 371 (c)(1),
(2) Date: Jul. 13, 2018

(87) PCT Pub. No.: WO2017/123005
PCT Pub. Date: Jul. 20, 2017

(65) Prior Publication Data
US 2019/0053088 A1      Feb. 14, 2019

Related U.S. Application Data

(60) Provisional application No. 62/278,430, filed on Jan. 13, 2016, provisional application No. 62/305,534, (Continued)

(51) Int. Cl.
*H04W 24/10*      (2009.01)
*H04W 76/10*      (2018.01)
*H04W 72/08*      (2009.01)
*H04B 7/06*      (2006.01)
*H04B 7/08*      (2006.01)
*H04W 84/12*      (2009.01)
*H04W 16/28*      (2009.01)

(52) U.S. Cl.
CPC .......... *H04W 24/10* (2013.01); *H04B 7/0632* (2013.01); *H04B 7/088* (2013.01); (Continued)

(58) Field of Classification Search
CPC .... H04B 7/088; H04B 7/0632; H04B 7/0617; H04B 7/0695; H04B 7/0408; H04B 7/0697
See application file for complete search history.

(56) References Cited

U.S. PATENT DOCUMENTS 6,999,771 B1 * 2/2006 Kasapi ................ H04W 72/046
455/450
8,509,209 B2 * 8/2013 Chun .................... H04L 1/0028
370/343

(Continued)

OTHER PUBLICATIONS

PCT International Application No. PCT/KR2017/000376, Written Opinion of the International Searching Authority dated Apr. 13, 2017, 3 pages.

(Continued)

*Primary Examiner* — Ayaz R Sheikh
*Assistant Examiner* — Debebe A Asefa
(74) *Attorney, Agent, or Firm* — Lee Hong Degerman Kang Waimey

(57) ABSTRACT

Provided are a method and a device for reporting channel quality for spatial sharing. The device receives, from an access point (AP), a channel quality request for evaluating spatial sharing, and transmits a channel quality report. The channel quality request includes information indicating whether channel quality results for each of a plurality of receive (RX) antennas are requested or an average of the channel quality results using the plurality of RX antennas is requested.

9 Claims, 18 Drawing Sheets

Related U.S. Application Data filed on Mar. 9, 2016, provisional application No. 62/306,080, filed on Mar. 10, 2016.

(52) U.S. Cl.
CPC ......... *H04W 72/085* (2013.01); *H04W 76/10* (2018.02); *H04W 16/28* (2013.01); *H04W 84/12* (2013.01)

(56) References Cited

U.S. PATENT DOCUMENTS

2012/0189077 A1* 7/2012 Seo .................. H04B 7/024 375/267

2013/0089000 A1 4/2013 Hansen et al.
2014/0112317 A1 4/2014 Liu et al.

OTHER PUBLICATIONS

Chen, et al., "Spatial Sharing Mechanism in 802.11aj (60GHz New Technique Proposal)", doc.: IEEE 802.11-14/0009r1, Jan. 2014, 19 pages.

Feng, et al., "SP Spatial Sharing among BSSs: Resolution to CID 143", doc.: IEEE 802.11-14/1103r0, Aug. 2014, 19 pages.

Feng, et al., "Proposed text resolution to CID 143 in CC12", doc.: IEEE 802.11-14/1383r2, Jan. 2015, 8 pages.

* cited by examiner

FIG. 3

| L-STF | L-CEF | L-Header | EDMG-Header-A | EDMG-STF | EDMG-CEF | EDMG-Header-B | Data | TRN |

FIG. 6

| Operation Class | Channel Number | AID | Reserved | Measurement Method |
|---|---|---|---|---|
| 1 | 1 | 1 | 1 | 1 |

Octets:

| Measurement Time | Measurement Duration | Number of Time Blocks | Optional Subelements |
|---|---|---|---|
| 8 | 2 | 1 | Variable |

Octets:

FIG. 7

| Operation Class | Channel Number | AID | Reserved | Measurement Method | Measurement Start Time |
|---|---|---|---|---|---|
| 1 | 1 | 1 | 1 | 1 | 8 |

Octets :

| Measurement Duration | Number of Time Blocks (N) | Measurement for Time Block 1 | ... | Measurement for Time Block N | Optional Subelements |
|---|---|---|---|---|---|
| 2 | 1 | 1 | | 1 | Variable |

Octets :

ial Application No. 62/278,430, filed
METHOD AND DEVICE FOR REPORTING CHANNEL QUALITY FOR SPATIAL SHARING

CROSS-REFERENCE TO RELATED APPLICATIONS

This application is the National Stage filing under 35 U.S.C. 371 of International Application No. PCT/KR2017/000376, filed on Jan. 11, 2017, which claims the benefit of U.S. Provisional Application No. 62/278,430, filed on Jan. 13, 2016, 62/305,534, filed on Mar. 9, 2016, and 62/306,080, filed on Mar. 10, 2016, the contents of which are all hereby incorporated by reference herein in their entirety.

BACKGROUND OF THE INVENTION

Field of the Invention

The present invention relates to wireless communication, and more particularly, to a method for reporting a channel quality for spatial sharing, and a device using the method.

Related Art

An institute of electrical and electronics engineers (IEEE) 802.11ad standard is a high-speed wireless communication protocol operating at a band of at least 60 GHz. Although a signal reaches in the range of about 10 meters, a throughput to be supported may be at least 6 Gbps. Since it operates at a high frequency band, signal propagation is dominated by ray-like propagation. The more the transmit (TX) or receive (RX) antenna beam aligned towards a strong spatial signal path, the better the signal quality may be.

The IEEE 802.11ad standard provides a beamforming training process for antenna beam alignment. IEEE 802.11ay is a next-generation standard which is being developed aiming at a throughput of at least 20 Gbps.

One of requirements discussed in the IEEE 802.11ay is to support a multi-channel and a bonding channel. A method for applying an operation using a single channel to the multi-channel is provided.

SUMMARY OF THE INVENTION

The present invention provides a method and device for reporting a channel quality for spatial sharing in a wireless local area network, In an aspect, a method for reporting a channel quality for spatial sharing (SPSH) in a wireless local area network is provided. The method includes establishing, by a station (STA), a link with an access point (AP) using a plurality of receive (RX) antennas by performing a sector sweep during a beamforming training, receiving, by the STA, a channel quality request for SPSH assess from the AP, and transmitting, by the STA, a channel quality report to the AP in response to the channel quality request. The channel quality request comprises an RX antenna measurement report method field indicating whether a channel quality result for each of the plurality of RX antennas is requested or an average of channel quality results using the plurality of RX antennas is requested.

The channel quality request may comprise a measurement channel bitmap field indicating one or more measurement channels for which a measurement of channel quality is to be performed among a plurality of channels.

The channel quality request may comprise a channel measurement report method field indicating whether a channel quality result for each of the one or more measurement channels is requested or whether an average of channel quality results for all of the one or more measurement channels is requested.

In another aspect, a device for reporting a channel quality for spatial sharing (SPSH) in a wireless local area network is provided. The device includes a transceiver configured to transmit and receive a radio signal, and a processor operatively coupled to the transceiver. The processor is configured to establish a link with an access point (AP) using a plurality of receive (RX) antennas by performing a sector sweep during a beamforming training, receive a channel quality request for SPSH assess from the AP, and transmit a channel quality report to the AP in response to the channel quality request. The channel quality request comprises an RX antenna measurement report method field indicating whether a channel quality result for each of the plurality of RX antennas is requested or an average of channel quality results using the plurality of RX antennas is requested.

Spatial sharing between devices can be improved in an environment where a plurality of antennas are configured and a plurality of channels are configured.

BRIEF DESCRIPTION OF THE DRAWINGS

FIG. 3 is a diagram illustrating an example of the PPDU format for the proposed communication.

FIG. 6 shows a field format for a channel quality request.

FIG. 7 shows a field format for a channel quality report.

DESCRIPTION OF EXEMPLARY EMBODIMENTS

Below, a wireless communication system that operates at a frequency band of 60 GHz or 45 GHz or above will be exemplarily described. A plurality of channels may be provided. For example, one channel may have a bandwidth of 2.16 GHz.

A station (STA) may be referred to as various names such as a wireless device, a mobile station (MS), a network interface device, a wireless interface device, or a user.

A Basic service set (BSS) is a building block of the wireless local area network (WLAN) based on the IEEE 802.11 standard. The BSS may include a plurality of STAs which perform direct communication with each other. The WLAN may provide two types of sets, for example, independent BSS (IBSS) and personal BSS (PBSS). The IBSS may be a basic type. The PBSS may be a type of wireless local area network (WLAN), in which the respective STAs communicate directly with each other, as an ad-hoc network. A STA in the PBSS may perform a role of the PBSS control point (PCP). The PCB may provide a beacon transmission, a service period (SP) allocation, etc.

An access point (AP) may be an entity which provides a connection (or association) between multiple BSSs. One STA in the PBSS may perform a role of the AP and another STA that belongs to different BSSs may communicate through the AP. The AP may manage the beacon transmission and association (or association response). Hereinafter, the AP and the PCP, which are not divided separately, may be referred to as a "AP".

The STA may include non-AP STA or AP unless a STA function and an AP function are divided separately. When a communication between the STA and the AP is described, the STA may be interpreted as the non-AP STA. When a communication between a STA and a STA is described or when the AP function is not required separately, the STA may be the non-AP STA or the AP.

Figure 1:
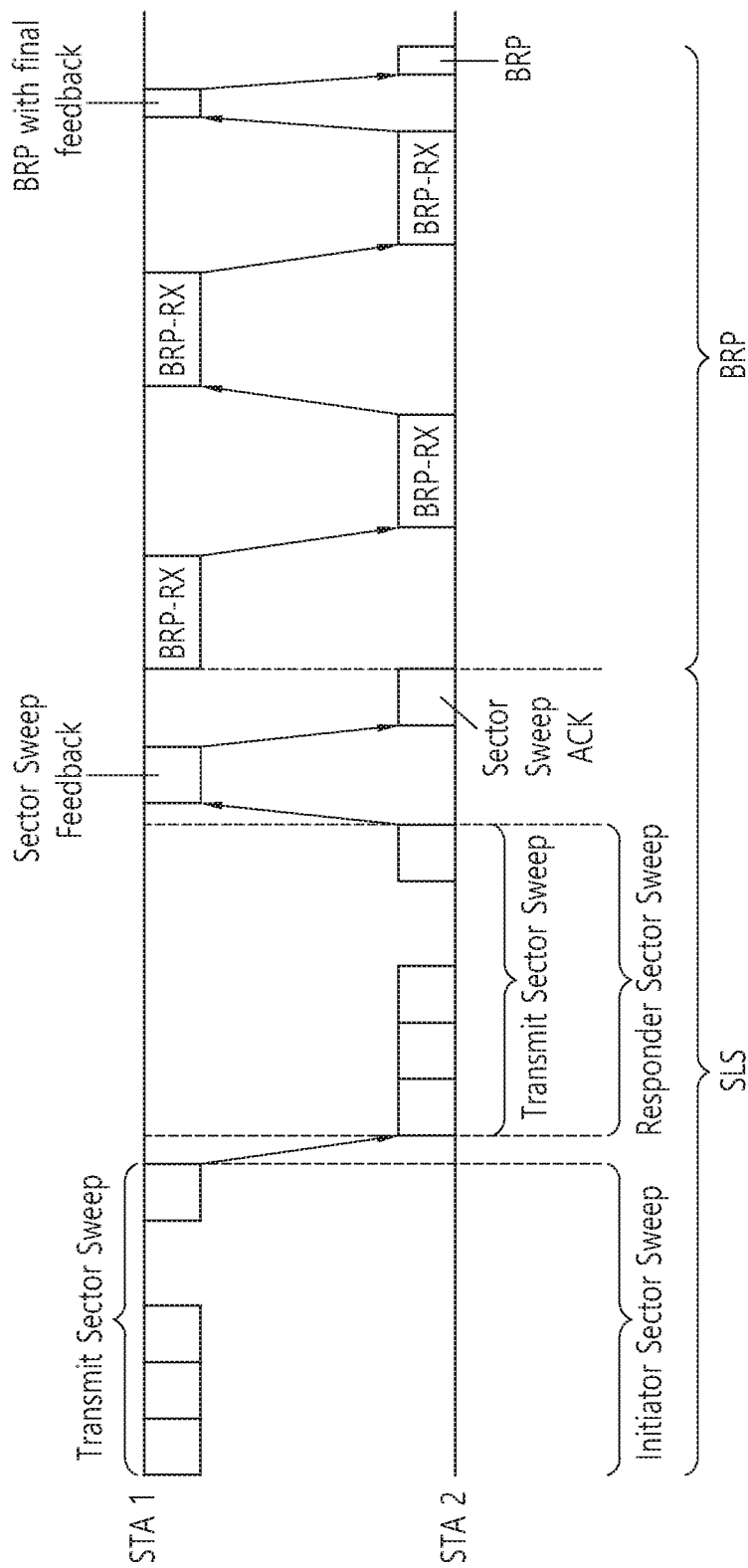
FIG. 1 shows a conventional beamforming training procedure.

FIG. 1 shows a conventional beamforming training procedure. This procedure may refer to section 9.35 of the IEEE 802.11ad standard.

A STA1 may be an initiator that initiates beamforming (BF) training. A STA2 that participates in the BF training may be a responder.

The BF training provides a transmission of a BF training frame using a sector sweep (SSW) and a signaling required for each STA to determine setting an appropriate antenna system. The BF training process may include a sector level sweep (SLS) process and a beam refinement protocol (BRP) process. The SLS process for the sector sweep may allow communication between the STAs to provide a control physical layer (PHY). The BRP process provides a refinement of an antenna weight vector between the transmitter and the receiver.

The BF training may be initiated by the initiator from the SLS process. The SLS process may include an initiator sector sweep (ISS) for training an initiator link, a responder sector sweep (RSS) for training a responder link, a sector sweep (SSW) feedback, and a SSW ACK.

During the ISS process, the initiator may transmit each frame (a beacon frame or a SSW frame) to each of the sectors which the initiator has. During the RSS process, the responder may transmit each of the SSW frames to each of the sectors which the responder has. During the SSW process, the initiator may send a SSW feedback frame to the responder. The SSW feedback frame may include information about a sector and an antenna which are selected by the initiator. The SSW ACK frame may be transmitted through a sector included in the SSW feedback frame which is most recently received and the antenna.

A sector may correspond to a specific antenna beam or pattern. A transmit (TX) sector may be a sector for a TX antenna, and a receive (RX) sector may be a sector for a RX antenna.

A sector (a TX sector and/or a RX sector) in which an initiator has the best quality and a sector (a TX sector and/or a RX sector) in which a responder has the best quality may be determined through the SLS process.

When the SLS process is completed, the BRP process for training an RX antenna array and a TX antenna array may be initiated. The BRP process may include a BRP setup subphase, a multiple sector ID detection (MID) subphase, a beam combining (BC) subphase, and the like.

Figure 2:
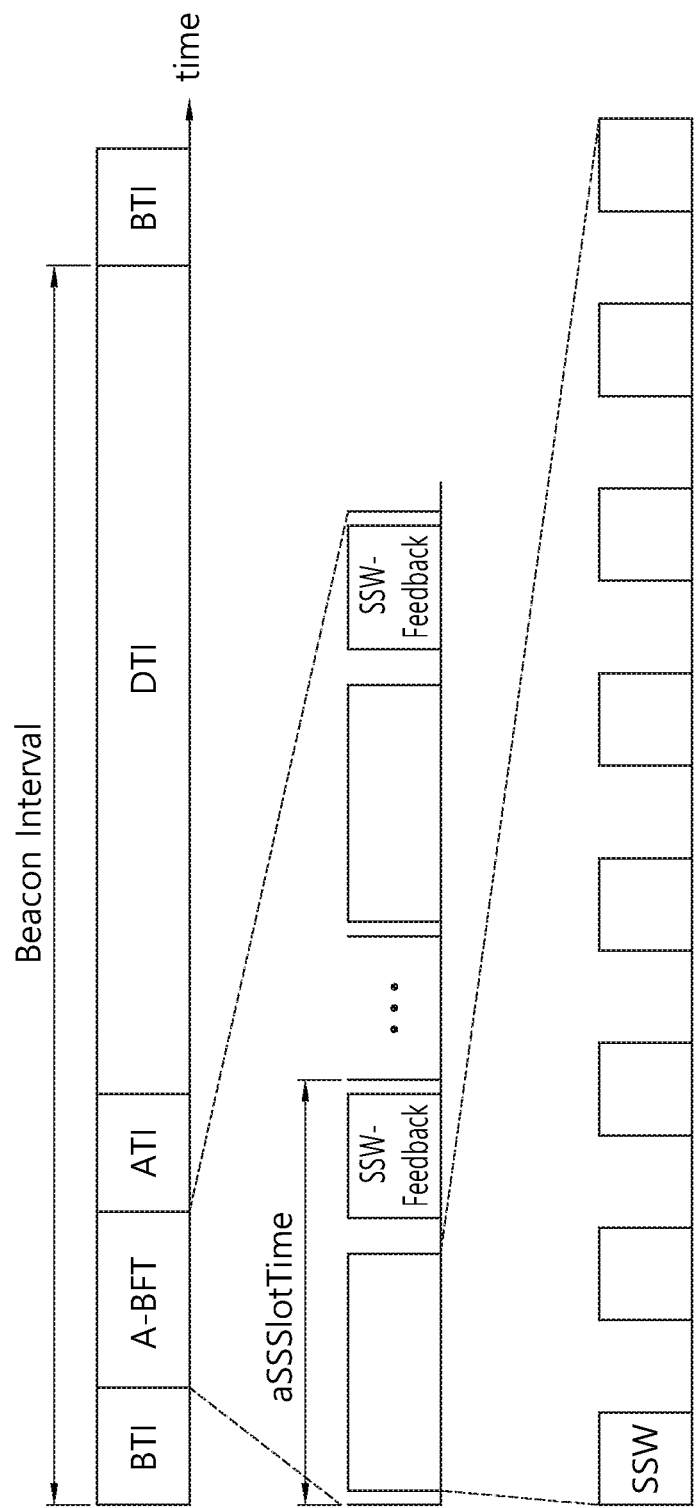
FIG. 2 is a diagram illustrating an example of a SLS process.

FIG. 2 is a diagram illustrating an example of a SLS process.

When an initiator is an AP and a responder is a non-AP STA, a beacon frame may be transmitted during the ISS process. A beacon interval may be a time period in which a beacon frame is transmitted.

A beacon transmission interval (BTI) may be a time interval between the start of a first beacon transmission by the AP in a beacon interval to the end of a last beacon transmission by the AP in the same beacon interval. An association beamforming training (A-BFT) may be a time period including a responder sector sweep (RSS) and a SSW feedback in the SLS process for beamforming (BF). An announcement transmission interval (ATI) may be a time interval for a request-response based management between the AP and the STA. A data transfer interval (DTI) may be a time interval for exchanging data.

The A-BFT is performed by a SSW slot unit, and a length of the A-BFT is defined as an integer multiple length of the SSW slot. A-BFT length information may be included in the beacon frame.

The SSW slot has a length of aSSSlotTime. The aSSSlotTime is defined as follows: aSSSlotTime=aAirPropagationTime+aSSDuration+ MBIFS+aSSFBDuration+MBIFS. The aAirPropagationTime is a parameter considering the propagation delay between the initiator and the responder. The aSSDuration is a time for the responder to transmit M SSW frames in the SSW slot. Information about the number M of allowed SSW frames per a SSW slot may be included in the beacon frame. FIG. 2 is a diagram illustrating a case where M=8. Medium beamforming interframe spacing (MBIFS) represents an interval between the BTI and A-BFT or an interval between ISS, RSS, SSW feedback, and SSW ACK.

At the beginning of each A-BFT, the STA as the responder may invoke a random back-off process to start or resume the RSS. At the beginning of the A-BFT, the STA may randomly select a backoff count from a uniform distribution [0, (A-BFT length-1)]. The STA decrements the backoff counter by one at the end of each SSW slot. The STA initiates RSS in the corresponding SSW slot when the back-off count value is 0 at the start of the SSW slot. In the corresponding SSW slot, the STA may transmit a maximum of M SSW frames. If there are more SSW frames sent by the STA, the RSS may be resumed in the next SSW slot before the A-BFT is finished. If the RSS is not completed before the A-BFT is finished, the backoff process may be performed again before the RSS is resumed in the next A-BFT.

The AP may send a SSW feedback before the SSW slot expires. The information included in the SSW feedback may be based on the SSW frame received in the SSW slot where the SSW feedback is transmitted. The SSW feedback may include information about a sector and an antenna which are selected by the AP.

The STA has an RSS fail count. Although the RSS fail count is performed during an A-BFT(s) period, the RSS fail count may be the number of consecutive times which do not receive the SSW feedback as a response. For example, it may be assumed that an A-BFT period has 8 SSW slots and the STA transmits SSW frames in 4 SSW slots for 2 A-BFT periods. If the STA does not receive the SSW feedback from 3 SSW slots of 4 SSW slots, the value of the RSS fail count may be 3.

When the value of the RSS fail count exceeds the RSS retry limit, the STA may select a random value selected from the uniform distribution [0, RSSBackoff) as a backoff count. The STA may decrement the backoff count by 1, one by one at the end of each A-BFT. When the backoff count reaches zero, the STA may resume the RSS in the A-BFT. When the STA receives the SSW feedback during the A-BFT, the RSS fail count may be set to zero.

FIG. 3 is a diagram illustrating an example of the PPDU format for the proposed communication.

A Physical layer protocol data unit (PPDU) is a data block exchanged in two physical (PHY) entities. The PPDU may be also referred to as "enhanced directional multi-gigabit (EDMG) PPDU" to distinguish from an existing 802.11 b/g/n/ac based PPDU.

The EDMG PPDU may include a legacy short training field (L-STF), a legacy channel estimation field (L-CEF), a legacy header field (L-Header), an EDMG header A field (EDMG-Header-A), EDMG short training field (EDMG-STF), EDMG channel estimation field (EDMG-CEF), data field, automatic gain control field (AGC), and training sequences field (TRN). All fields may be not required. Some fields may be omitted and other fields may be added. For example, an EDMG-Header-B field next to an EDMG-CEF may be added.

L-CEF is used for channel estimation. The L-Header may include information about the reception of the data field. The L-Header may include an indication of the modulation and coding scheme (MCS), the length of the payload in the data field, and/or the presence of the EDMG-Header-A. The data field may include data for the user.

The EDMG-STF may be transmitted in one or more spatial streams, and the structure of the EDMG-STF may be varied according to the number of channels used. The EDMG-CEF may be transmitted in one or more spatial streams, and the structure of the EDMG-CEF may be varied according to the number of channels used.

The EDMG-Header-A may include information used to interpret the EDMG PPDU. The EDMG-Header-A may include a format field, a bandwidth field, and stream information. The format field indicates whether the corresponding PPDU is a single user PPDU or a multi-user (MU) PPDU. The bandwidth field indicates a bandwidth in which the corresponding PPDU is transmitted. The stream information indicates the number of spatial streams which are allocated to a receiving STA.

The EDMG-Header-B may be included in a DMG MU PPDU only. The EDMG-Header-B may include information related to a length of a PSDU in a Data field and a modulation and coding scheme (MCS).

Figure 4:
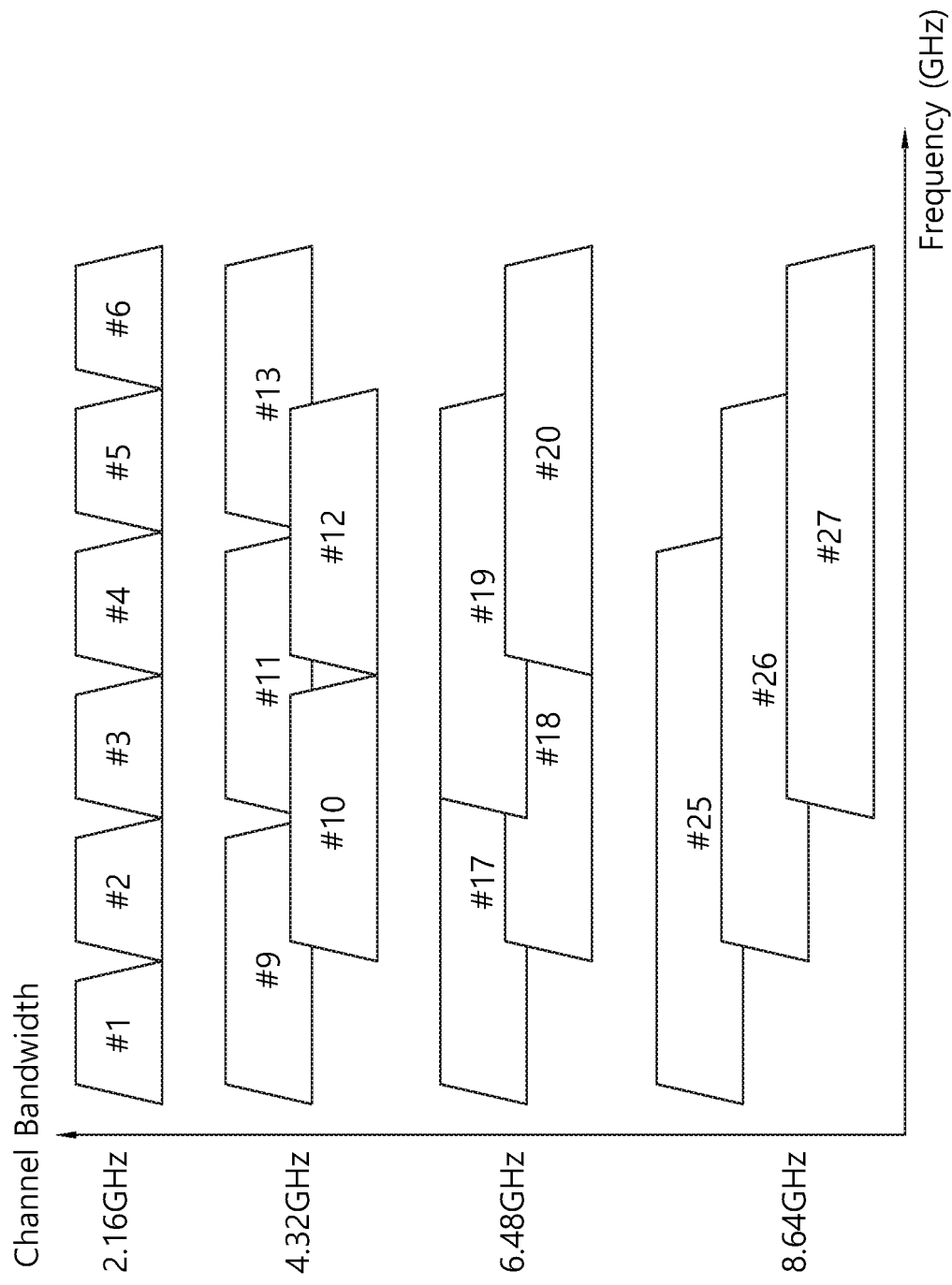
FIG. 4 shows an example of channelization to which an embodiment according to the present invention is applied.

FIG. 4 shows an example of channelization to which an embodiment according to the present invention is applied.

There are 8 basic channels. Although each basic channel has a bandwidth of 2.16 GHz, the number of basic channels and the bandwidth are not limited thereto. A bonding channel may be defined by bonding a plurality of basic channels. For example, a bonding channel having a bandwidth of 4.32 GHz may be defined by bonding 2 basic channels. A bonding channel having a bandwidth of 6.48 GHz may be defined by bonding 3 basic channels. A bonding channel having a bandwidth of 8.64 GHz may be defined by bonding 4 basic channels.

Figure 5:
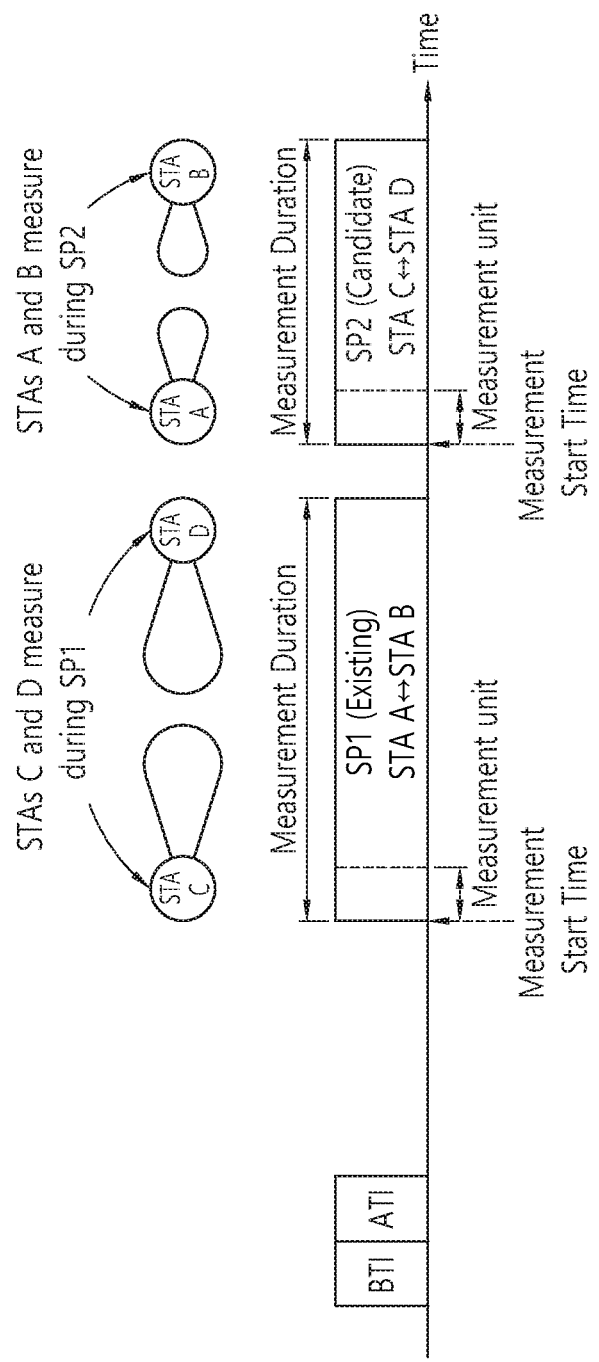
FIG. 5 shows an example of a spatial sharing (SPSH) protocol in the existing IEEE 802.11ad.

FIG. 5 shows an example of a spatial sharing (SPSH) protocol in the existing IEEE 802.11ad.

The SPSH uses one link at the same channel while giving an opportunity of using a channel to another link which does not have an effect on the link, thereby improving a total data transfer rate.

A service period (SP) is a time duration scheduled for communication between STAs. The scheduled SP is called an existing AP, and an SP used for SPSH assess is called a candidate SP. Each SP may correspond to one link.

To assess the possibility for performing the SPSH, an AP may request the STA to perform a radio resource measurement.

It is assumed that an SP1 is the existing SP, and an SP2 is the candidate SP. The AP sends a channel quality request to an STA C and an STA D during the SP1. An STA A and an STA B are communicating during the SP 1. The STA C and the STA D measure channel quality, and report a result thereof to the AP. The AP sends a channel quality request to the STAA and the STA B during the SP 2. The STA C and the STA D are communicating during the SP 2. The STA A and the STA B measure channel quality, and report a result thereof to the AP.

FIG. 6 shows a field format for a channel quality request. The channel quality request is transmitted by a requesting STA to a requested STA to perform a measurement on a target STA.

An Operating Class field indicates a channel set to which a measurement request is applied. A Channel Number field indicates a channel number to which the measurement request is applied. An AID field indicates the target STA.

A Measurement Method field indicates a method of performing and reporting a measurement by the requested STA. For example, if this field is 0, it may indicate ANIPI (average noise plus interference power indicator), and if this field is 1, it may indicate RSNI (received signal-to-noise indicator).

A Measurement Start Time field indicates a time at which the requested measurement starts. A Measurement Duration field indicates a duration of the requested measurement. A Number of Time Blocks field indicates the number of measurement units in a measurement duration. A Measurement Duration/Number of Time Blocks indicates a duration of a measurement unit.

FIG. 7 shows a field format for a channel quality report.

An Operating Class field indicates a channel set to which a measurement report is applied. A Channel Number field indicates a channel number to which the measurement report is applied. An AID field indicates a target STA.

A Measurement Method field indicates a method of performing and reporting a measurement by a requested STA. If this field is 0, a Measurement for Time Block field may be expressed by ANIPI, and if this field is 1, the Measurement for Time Block field may be expressed by RSNI.

A Measurement Start Time field indicates a time at which the requested measurement starts. A Measurement Duration field indicates a duration of the requested measurement. A Number of Time Blocks field indicates the number of measurement units in a measurement duration. A Measurement for Time Block n (1<=n<=N) field includes a measurement result for an n-th measurement unit.

Only a single channel is considered in the SPSH assess protocol. When a plurality of channels and/or a plurality of antennas are configured, the SPSH assess may be performed for each channel, and each channel quality report may be exchanged, which may cause excessive message exchange.

In an embodiment described below, an SPSH assess protocol is proposed as follows.

First, it is proposed a channel in which an AP requests STAs in a candidate link for SPSH to perform a channel quality measurement and the STAs which have received the request report channel quality. The channel measurement may be performed by a channel used by the STA of the candidate link.

Second, it is proposed a structure of a frame for a channel quality request and a frame for a channel quality report.

A plurality of transmit (TX) antennas and/or a plurality of receive (RX) antennas may be configured in an AP and an STA. Hereinafter, the antenna may be not a physical antenna but a logical antenna including one or more physical antennas. Each antenna configuration may be defined in the TX/RX antenna. A plurality of antenna configurations may be defined respectively in the plurality of RX antennas.

Figure 8:
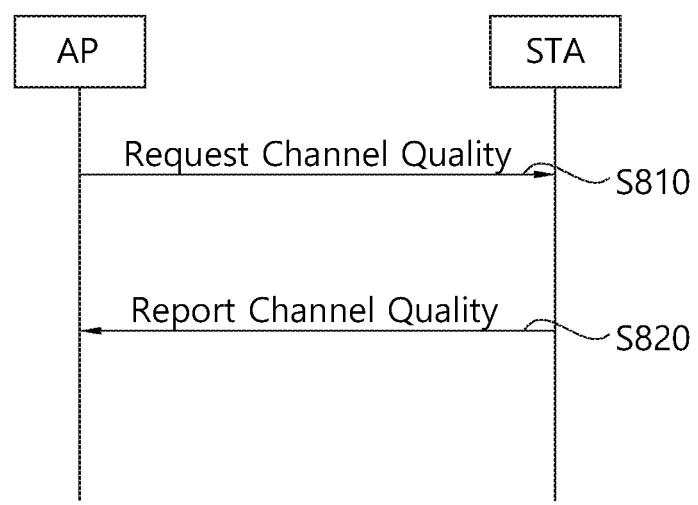
FIG. 8 is a flowchart showing a measurement method for SPSH assess according to an embodiment of the present invention.

FIG. 8 is a flowchart showing a measurement method for SPSH assess according to an embodiment of the present invention.

First, an AP and an STA perform sector sweep during beamforming training to establish a link.

In step S810, the AP sends a channel quality request to the STA via a transmission channel to request for a channel quality measurement for SPSH assess. The AP may instruct to measure channel quality in a link in which allocation is finished and data transmission is being performed and/or a candidate link capable of participating in the SPSH.

In step S820, the STA sends a channel quality report having a channel measurement result to the AP via the transmission channel. The STA may measure the channel quality in a link for which a channel measurement is to be performed. A channel for which a channel quality measurement is to be performed is called a measurement channel. For example, if 4 measurement channels are configured, channel quality may be measured for each of the 4 measurement channels.

The AP may perform the SPSH according to the received channel measurement result. On the basis of the measurement result, the AP may allow to participate in the SPSH by selecting a link which satisfies channel quality enough to use a channel with the SPSH among candidate links.

A transmission channel for transmitting a channel quality request and/or a channel quality report may be selected as follows among a plurality of channels.

In an embodiment, the transmission channel may be a primary channel among the plurality of channels. The primary channel may be a channel designated as a primary channel of BSS by an AP. A full carrier sense is maintained in the primary channel. A PPDU for carrying a corresponding frame may include information on the primary channel. For example, EDMG-Header-A may include the information on the primary channel.

Irrespective of a channel to be used by STAs on a candidate link, only the primary channel may be used to exchange the channel quality request and/or the channel quality report. The AP/STA in a candidate SP may exchange the channel quality request and/or the channel quality report via the primary channel. All STAs maintain a carrier sense while always opening the primary channel. Therefore, since the STA monitors reception of the channel quality request and/or the channel quality report only in the primary channel, power consumption can be reduced.

In another embodiment, the transmission channel may be a measurement channel for which a channel quality measurement is to be performed. The AP and the STA may exchange the channel quality request and/or the channel quality report via a channel to be used by the STA on the candidate link. In the presence of the plurality of measurement channels, the channel quality request and/or the channel quality report may be transmitted on each of the plurality of measurement channels.

Now, a frame structure for a channel quality request and a channel quality report is described. In the following embodiment, a field name and the number of bits are for exemplary purposes only, and not all fields are necessary.

Figure 9:
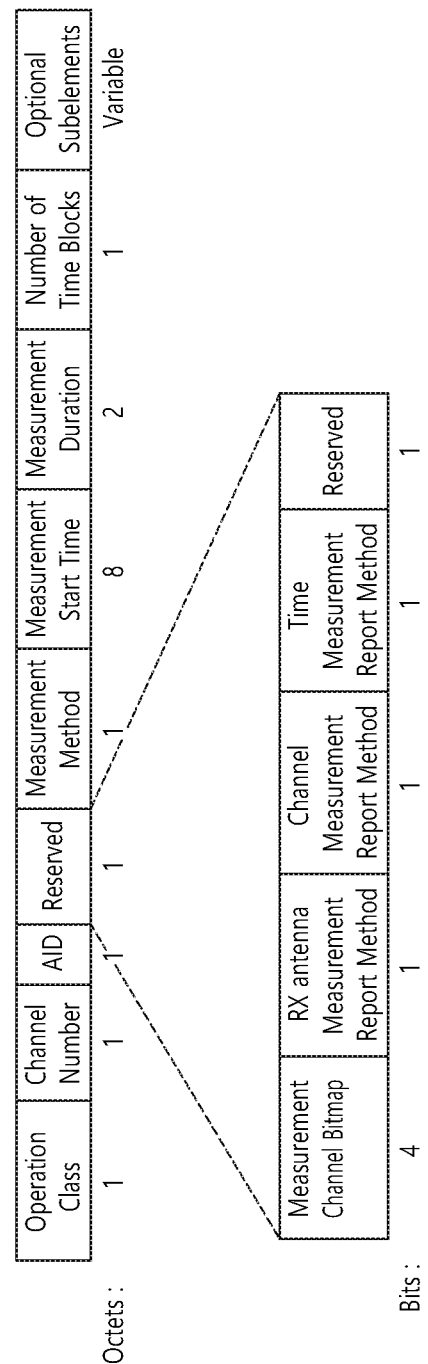
FIG. 9 shows a channel quality request according to an embodiment of the present invention.

FIG. 9 shows a channel quality request according to an embodiment of the present invention.

An Operating Class field, a Channel Number field, an AID field, a Measurement Method field, a Measurement Start Time field, a Measurement Duration field, and a Number of Time Blocks field are the same as described with reference to FIG. 6.

A Measurement channel bitmap field indicates a measurement channel of which channel quality is to be measured. For example, if there are 4 channels, the Measurement channel bitmap field has 4 bits, and if the bit is 1, the channel is a measurement channel. If the number of channels is increased, the number of bits of the Measurement channel bitmap field may be increased.

An RX antenna Measurement Report Method field indicates a method of reporting channel quality according to an antenna used in transmission/reception in a measurement channel. The RX antenna Measurement Report Method field may indicate whether to report a measurement result for each RX antenna during a measurement unit or to report an average value of measurement results regarding all RX antennas. For example, if the RX antenna Measurement Report Method field is 0, the result measured during the measurement unit may be reported for each RX antenna. If the RX antenna Measurement Report Method field is 1, the average value of the measurement results regarding all RX antennas during the measurement unit may be reported.

A Channel Measurement Report Method field indicates a method of reporting channel quality according to a measurement channel. The Channel Measurement Report Method field may indicate whether to report a measurement result for each measurement channel or to report an average of measurement results for all measurement channels. For example, if the Channel Measurement Report Method field is 0, a measurement result for each measurement channel during a measurement unit may be reported. If the Channel Measurement Report Method field is 1, an average of measurement results for all measurements channels during the measurement unit may be reported.

A Time Measurement Report Method field indicates a method of requesting channel quality according to a measurement unit. The Time Measurement Report Method field may indicate whether to report a measurement result for each measurement unit or to report an average of measurement results for all measurement units. For example, if the Time Measurement Report Method field is 0, the measurement result for each measurement unit may be reported. If the Time Measurement Report Method field is 1, the average of measurement results for all measurement units may be reported.

The Measurement report method, the measurement duration, the number of time blocks, and the measurement start time are commonly applied to all measurement channels.

Figure 10:
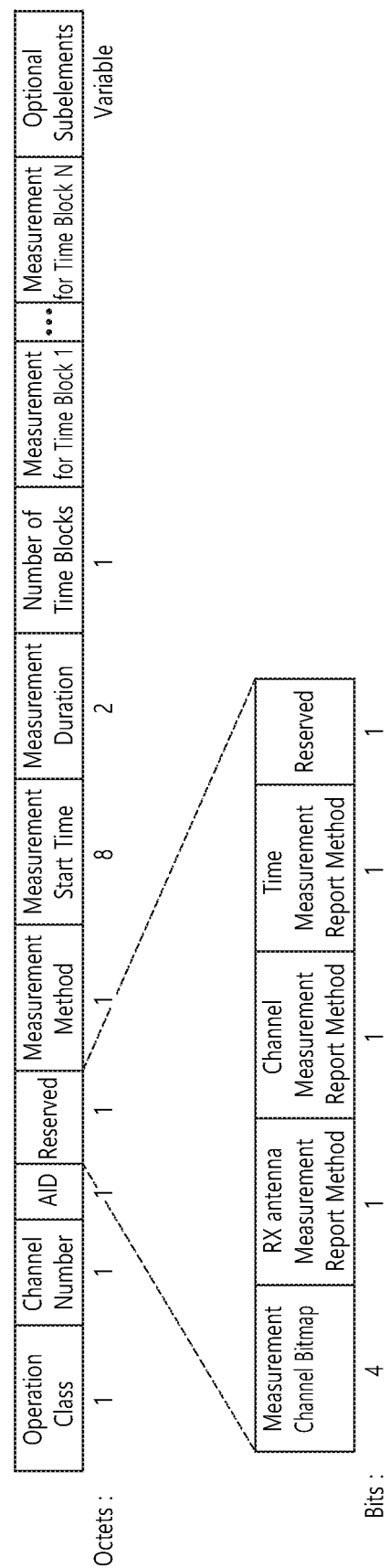
FIG. 10 shows a channel quality report according to an embodiment of the present invention.

FIG. 10 shows a channel quality report according to an embodiment of the present invention.

An Operating Class field, a Channel Number field, an AID field, a Measurement Method field, a Measurement Start Time field, a Measurement Duration field, a Number of Time Blocks field, and a Measurement for Time Block n field are the same as described with reference to FIG. 7, A Measurement channel bitmap field indicates a measurement channel of which channel quality is to be measured. For example, if there are 4 channels, the Measurement channel bitmap field has 4 bits, and if the bit is 1, the channel is a measurement channel. If the number of channels is increased, the number of bits of the Measurement channel bitmap field may be increased. For example, if the number of channels is 8, the Measurement channel bitmap field may have 8 bits. Alternatively, even if the number of channels is 8, the Measurement channel bitmap field may have a compressed bitmap of 6 bits.

An RX antenna Measurement Report Method field indicates a method of reporting channel quality according to an antenna used in transmission/reception in a measurement channel. The RX antenna Measurement Report Method field may indicate whether to report a measurement result for each RX antenna during a measurement unit or to report an average value of measurement results regarding all RX antennas. For example, if the RX antenna Measurement Report Method field is 0, the result measured during the measurement unit may be reported for each RX antenna. If the RX antenna Measurement Report Method field is 1, the average value of the measurement results regarding all RX antennas during the measurement unit may be reported.

A Channel Measurement Report Method field indicates a method of reporting channel quality according to a measurement channel. The Channel Measurement Report Method field may indicate whether to report a measurement result for each measurement channel or to report an average of measurement results for all measurement channels. For example, if the Channel Measurement Report Method field is 0, a measurement result for each measurement channel during a measurement unit may be reported. If the Channel Measurement Report Method field is 1, an average of measurement results for all measurements channels during the measurement unit may be reported.

A Time Measurement Report Method field indicates a method of requesting channel quality according to a measurement unit. The Time Measurement Report Method field may indicate whether to report a measurement result for each measurement unit or to report an average of measurement results for all measurement units. For example, if the Time Measurement Report Method field is 0, the measurement result for each measurement unit may be reported. If the Time Measurement Report Method field is 1, the average of measurement results for all measurement units may be reported.

The Measurement method, the measurement duration, the number of time blocks, and the measurement start time are commonly applied to all measurement channels.

Figure 11:
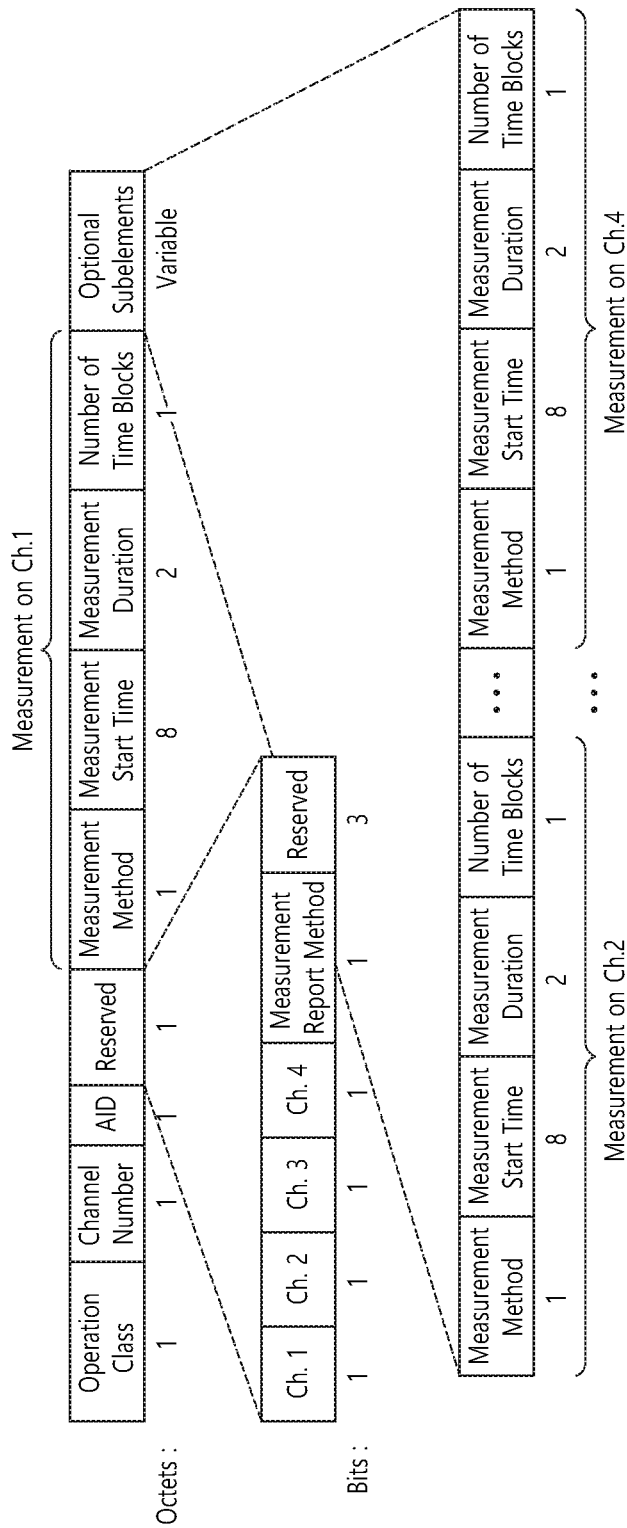
FIG. 11 shows a channel quality request according to another embodiment of the present invention.

FIG. 11 shows a channel quality request according to another embodiment of the present invention.

A Measurement channel bitmap field includes 4 bits of Ch1, Ch2, Ch3, and Ch4 respectively corresponding to 4 channels. For example, if Ch1 is 1, it may indicate that a channel 1 is a measurement channel, and if Ch1 is 0, it may indicate that the channel 1 is not the measurement channel. However, this is for exemplary purposes only, and if the number of channels is increased, the Measurement channel bitmap field may have more bits. For example, if the number of channels is 8, the Measurement channel bitmap field may have 8 bits. Alternatively, even if the number of channels is 8, the Measurement channel bitmap field may have a compressed bitmap of 6 bits.

The Measurement Report Method field indicates a method of reporting channel quality. The Measurement Report Method field may indicate whether to report a measurement result for each measurement channel or to report an average of measurement results for all measurement channels. For example, if the Measurement Report Method field is 0, the measurement result for each measurement channel during the measurement unit may be reported. If the Measurement Report Method field is 0, the average of measurement results for all measurement channels during the measurement unit may be reported.

The measurement method, the measurement duration, the number of time blocks, and the measurement start time are given individually for each measurement channel.

Figure 12:
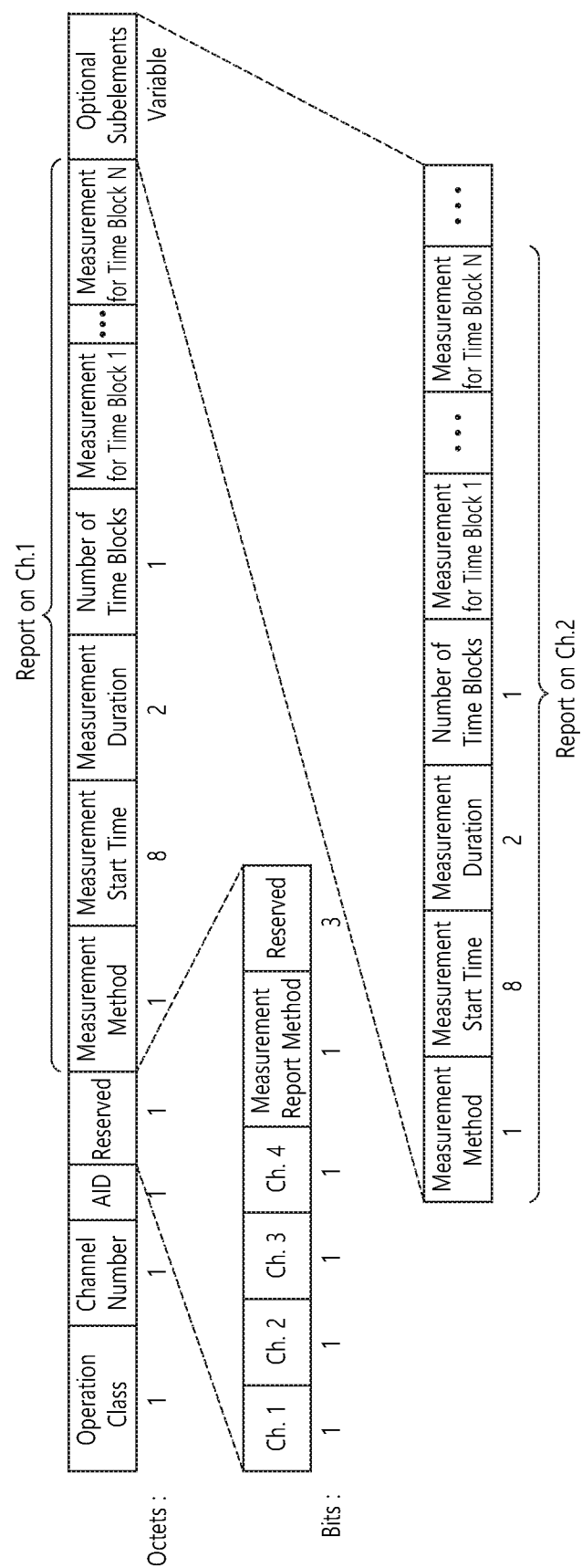
FIG. 12 shows a channel quality report according to another embodiment of the present invention.

FIG. 12 shows a channel quality report according to another embodiment of the present invention.

A Measurement channel bitmap field includes 4 bits of Ch1, Ch2, Ch3, and Ch4 respectively corresponding to 4 channels.

The Measurement Report Method field indicates a method of reporting channel quality. The Measurement Report Method field may indicate whether to report a measurement result for each measurement channel or to report an average of measurement results for all measurement channels. For example, if the Measurement Report Method field is 0, the measurement result for each measurement channel during the measurement unit may be reported. If the Measurement Report Method field is 0, the average of measurement results for all measurement channels during the measurement unit may be reported.

The measurement method, the measurement duration, the number of time blocks, and the measurement start time are given individually for each measurement channel.

Figure 13:
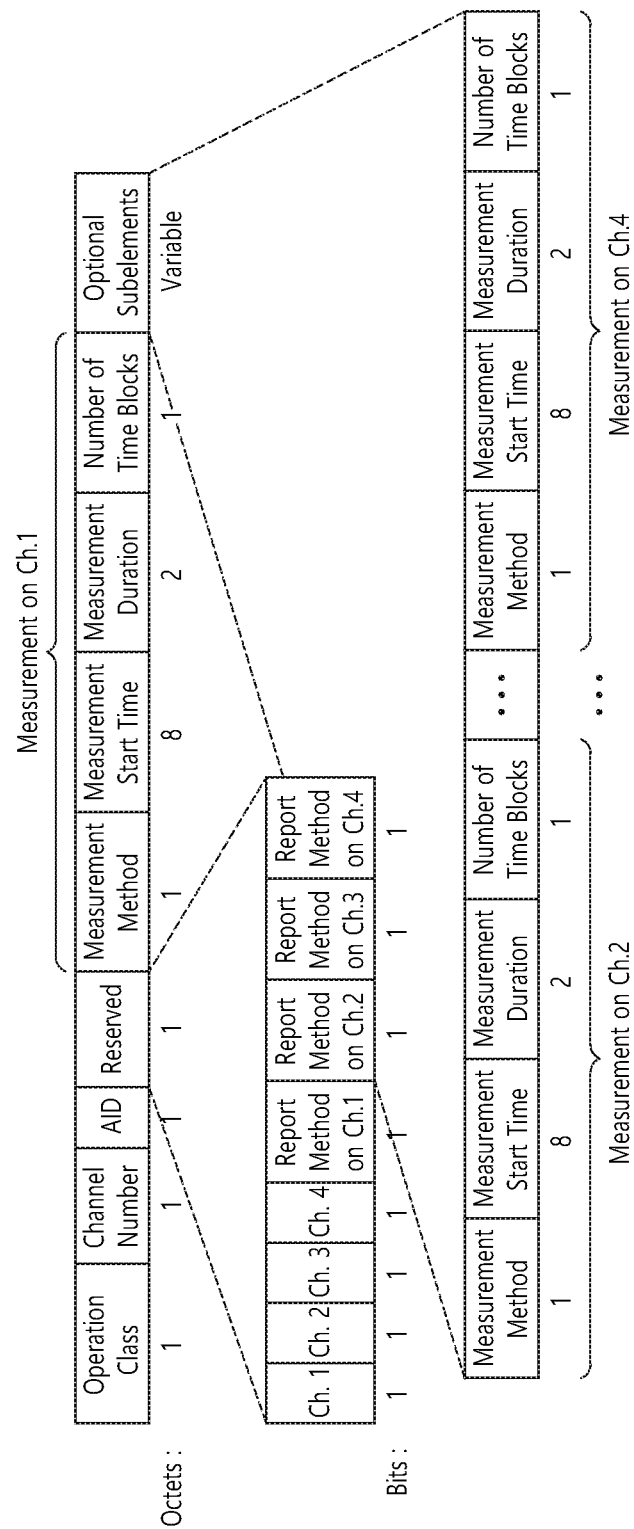
FIG. 13 shows a channel quality request according to another embodiment of the present invention.

FIG. 13 shows a channel quality request according to another embodiment of the present invention.

Comparing with the embodiment of FIG. 11, a report method may be given for each channel. The report method may indicate the aforementioned RX antenna Measurement Report Method and/or Time Measurement Report Method of FIG. 9.

Figure 14:
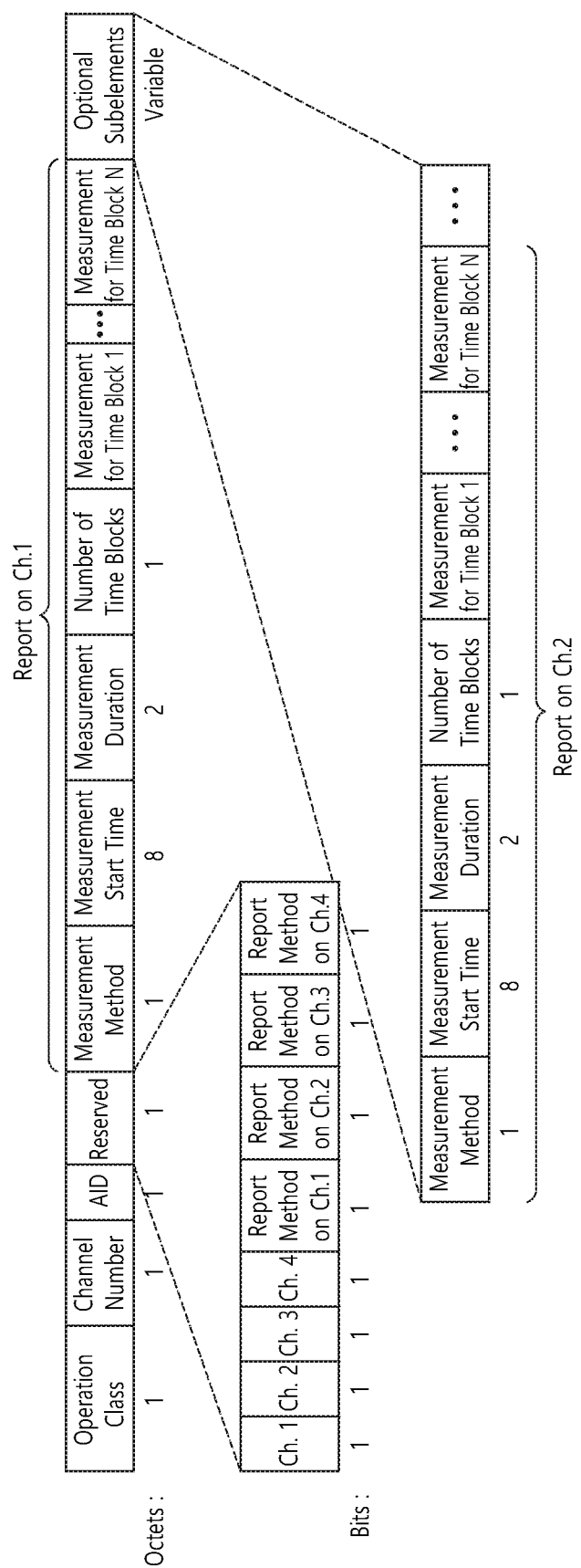
FIG. 14 shows a channel quality report according to another embodiment of the present invention.

FIG. 14 shows a channel quality report according to another embodiment of the present invention.

Comparing with the embodiment of FIG. 12, a report method may be given for each channel. The report method may indicate the aforementioned RX antenna Measurement Report Method and/or Time Measurement Report Method of FIG. 10.

Figure 15:
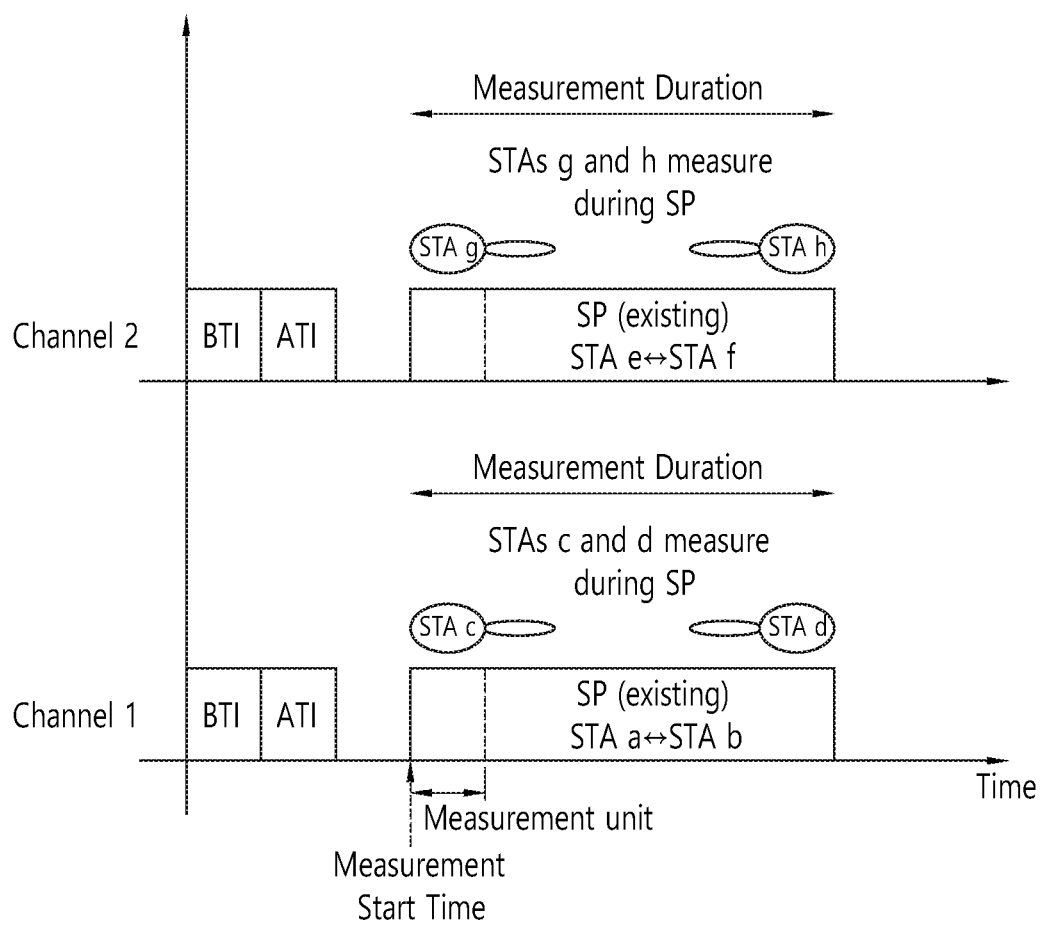
FIG. 15 shows an example of SPSH assess according to an embodiment of the present invention.

FIG. 15 shows an example of SPSH assess according to an embodiment of the present invention.

It is assumed that STAs a, b, c, and d operate in a channel 1, and STAs e, f, g, and h operate in a channel 2. For the STA c and the STA d, the channel 1 is a measurement channel. For the STA g and the STA h, the channel 1 is a measurement channel.

The STA c and the STA d may report channel quality for the channel 1, and the STA g and the STA h may report channel quality of the channel 2.

Figure 16:
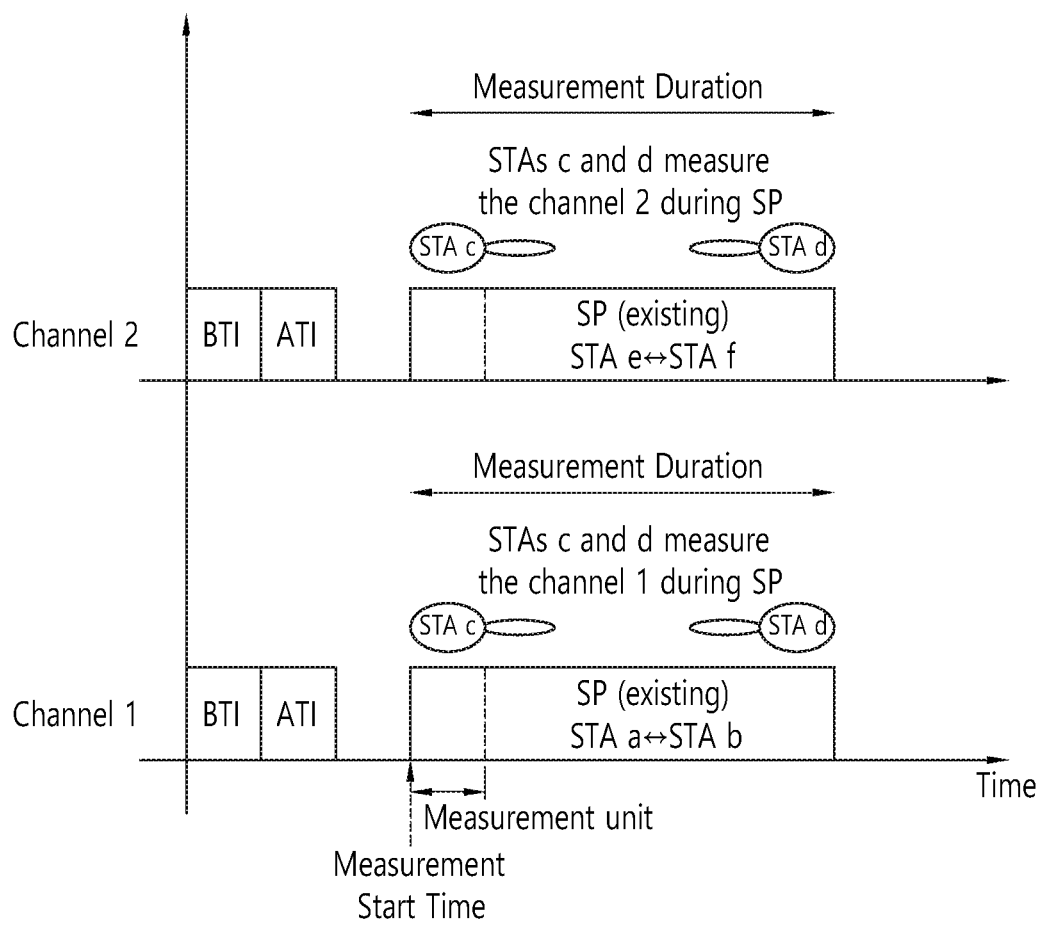
FIG. 16 shows another example of SPSH assess according to an embodiment of the present invention.

FIG. 16 shows another example of SPSH assess according to an embodiment of the present invention.

It is assumed that STAs a and b operate in a channel 1, and STAs e and f operate in a channel 2. The STAs c and d may operate in the channel 1 and the channel 2. An AP requests the STAs c and d to provide channel quality in the channel 1 and the channel 2. The STAs c and d report the channel quality in the channel 1 and the channel 2 to the AP. The AP may configure SPSH for at least any one of the channel 1 and the channel 2 to the STAs c and d.

Figure 17:
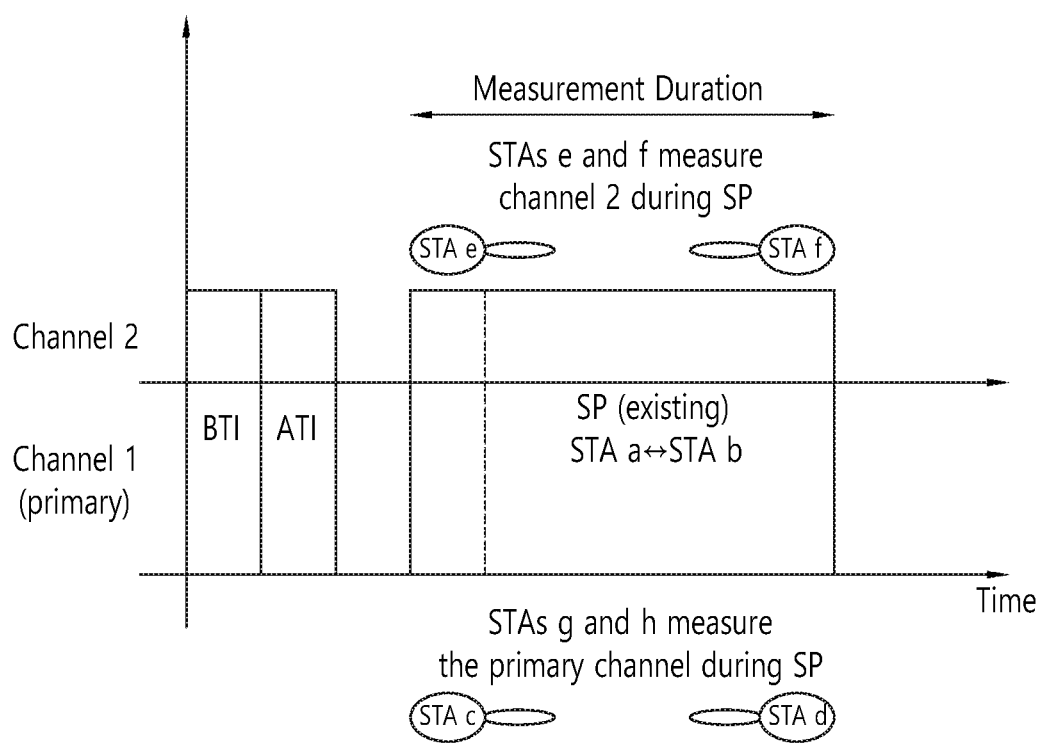
FIG. 17 shows another example of SPSH assess according to an embodiment of the present invention.

FIG. 17 shows another example of SPSH assess according to an embodiment of the present invention.

STAs a and b operate in a channel 1 and a channel 2, and has an assigned SP. It is assumed that STAs c and d operate in the channel 1, and STAs e and f operate in the channel 2. An AP requests the STAs c and d to provide channel quality in the channel 1. The AP requests the STAs e and f to provide channel quality in the channel 2.

Figure 18:
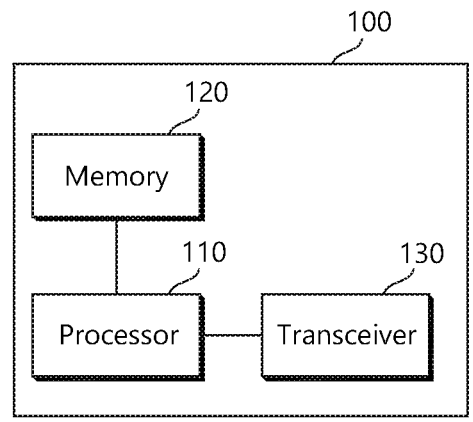
FIG. 18 is a block diagram of a device for which an embodiment of the present invention is implemented.

FIG. 18 is a block diagram of a device for which an embodiment of the present invention is implemented.

A device 100 includes a processor 110, a memory 120, and a transceiver 130.

The memory 120 is coupled to the processor 110 to store various instructions executed by the processor 110. The transceiver 130 is coupled to the processor 110 to transmit and/or receive a radio signal. The processor 110 implements the proposed functions, procedures, and/or methods. In the aforementioned embodiment, an operation of an STA or AP may be implemented by the processor 110. When the aforementioned embodiment is implemented with software instructions, the instructions may be stored in the memory 120, and may be executed by the processor 110 to perform the aforementioned operation.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The transceiver may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for reporting a channel quality for spatial sharing (SPSH) in a wireless local area network, the method comprising:
   establishing, by a station (STA), a link with an access point (AP) using a plurality of receive (RX) antennas by performing a sector sweep during a beamforming training;
   receiving, by the STA, a channel quality request for SPSH assess from the AP; and
   transmitting, by the STA, a channel quality report to the AP in response to the channel quality request,
   wherein the channel quality request comprises an RX antenna measurement report method field indicating whether a channel quality result for each of the plurality of RX antennas is requested or an average of channel quality results using the plurality of RX antennas is requested, and
   wherein the channel quality request further comprises:
      a measurement channel bitmap field indicating one or more measurement channels for which a measurement of channel quality is to be performed among a plurality of channels,
      a measurement start time field indicating a time at which the requested measurement starts, a measurement duration field indicating a duration of the requested measurement, and a unit number field indicating the number of measurement units within the duration of the requested measurement, and
      a channel measurement report method field indicating whether a channel quality result for each of the one or more measurement channels is requested or whether an average of channel quality results for all of the one or more measurement channels is requested.

2. The method of claim 1, wherein the channel quality request is received through one of the plurality of channels.

3. The method of claim 2, wherein the channel on which the channel quality request is received is a primary channel.

4. The method of claim 1, wherein the channel quality request comprises a time measurement report method indicating whether a channel quality result is requested for each measurement unit or whether an average of channel quality results is requested during the one or all measurement units.

5. The method of claim 1, wherein the channel quality report comprises an RX antenna measurement report method field indicating whether a channel quality result for each of the plurality of RX antennas is reported or whether an average of channel quality results using the plurality of RX antennas is reported.

6. The method of claim 1, wherein the channel quality report comprises a measurement channel bitmap field indicating one or more measurement channels for which channel quality is measured among the plurality of channels.

7. A device for reporting a channel quality for spatial sharing (SPSH) in a wireless local area network, the device comprising:
   a transceiver configured to transmit and receive a radio signal; and
   a processor operatively coupled to the transceiver and configured to:
   establish a link with an access point (AP) using a plurality of receive (RX) antennas by performing a sector sweep during a beamforming training;
   receive a channel quality request for SPSH assess from the AP; and
   transmit a channel quality report to the AP in response to the channel quality request,
   wherein the channel quality request comprises an RX antenna measurement report method field indicating whether a channel quality result for each of the plurality of RX antennas is requested or an average of channel quality results using the plurality of RX antennas is requested, and wherein the channel quality request further comprises:
- a measurement channel bitmap field indicating one or more measurement channels for which a measurement of channel quality is to be performed among a plurality of channels,
- a measurement start time field indicating a time at which the requested measurement starts, a measurement duration field indicating a duration of the requested measurement, and a unit number field indicating the number of measurement units within the duration of the requested measurement, and
- a channel measurement report method field indicating whether a channel quality result for each of the one or more measurement channels is requested or whether an average of channel quality results for all of the one or more measurement channels is requested.

8. The device of claim 7, wherein the channel quality request is received through one of the plurality of channels.

9. The device of claim 8, wherein the channel on which the channel quality request is received is a primary channel.

\* \* \* \* \*